United States Patent [19]
Khalar

[11] Patent Number: 5,160,014
[45] Date of Patent: Nov. 3, 1992

[54] CONVEYOR STRUCTURE FOR THE SIDEWALL OF A BOTTLE COMBINER

[76] Inventor: Lawrence J. Khalar, S. 86th W27660 Lakeview, Mukwanago, Wis. 53149

[21] Appl. No.: 847,405

[22] Filed: Mar. 6, 1992

[51] Int. Cl.⁵ ............................................. B65G 47/12
[52] U.S. Cl. ................................... 198/453; 198/454
[58] Field of Search ..................... 198/836.1, 453, 454, 198/455

[56] References Cited

U.S. PATENT DOCUMENTS

| | | | |
|---|---|---|---|
| 3,628,647 | 12/1971 | Beard | 198/454 |
| 3,862,680 | 1/1975 | Johnson | 198/454 |
| 3,934,706 | 1/1976 | Tice | 198/454 |
| 4,236,625 | 12/1980 | Smith et al. | 198/454 |
| 4,962,843 | 10/1990 | Ouellette | 198/454 X |

Primary Examiner—D. Glenn Dayoan
Attorney, Agent, or Firm—Wheeler Law Firm

[57] ABSTRACT

A conveyor structure for a sidewall of a bottle combiner. The sidewall having a top plate, bottom plate, and end plate to which are mounted two sets of roller bars at 45 degree angles to the top, bottom and end plates and at 90 degree angles to each other. The first set of roller bars having a diameter greater than the second set of roller bars and having slots of a depth slightly greater than the diameter of the second set of roller bars. The surfaces of the first and second set of roller bars being in alignment where they contact the bottles moving down the bottle combiner so that a uniform surface is presented and there are no gaps between roller bars.

2 Claims, 2 Drawing Sheets

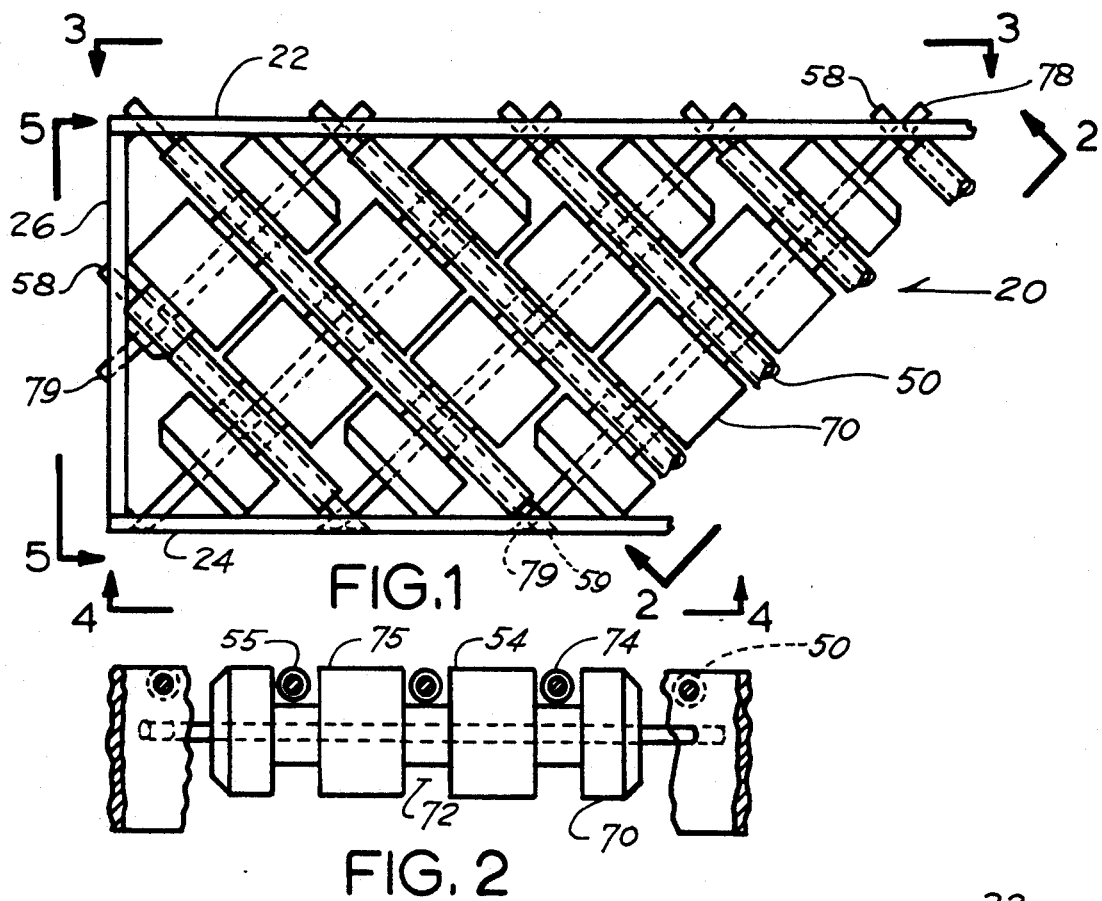
FIG. 1
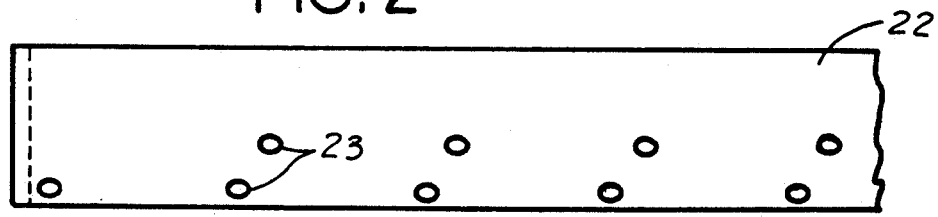
FIG. 2
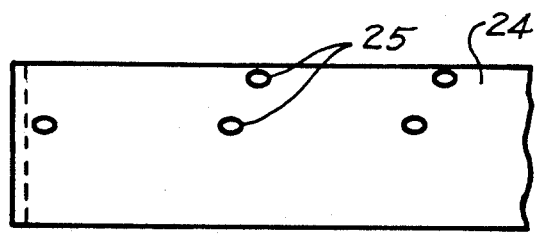
FIG. 3
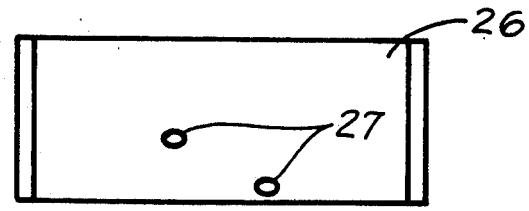
FIG. 4
FIG. 5 ern and bunch up in that area without slowing down the production line. Unfortunately, moving the bottles from single file to a bunch and back to single file can result in bottle jams in the bottle combiners. Consequently, the major stop gaps in bottle production lines are the bottle combiners. The down time that results from such jams is exceedingly expensive and sometimes such jams are fairly difficult to correct and can result in breakage of the bottles and loss of product.

CONVEYOR STRUCTURE FOR THE SIDEWALL OF A BOTTLE COMBINER

BACKGROUND OF THE INVENTION

The present invention is a bottle combiner of a unique and simple design. In the bottling industry it is necessary to move large amounts of bottles from one point to another. During this movement it is necessary at some point for the bottles to be moving in single file and at other points for the bottles to collect on a table or other suitable area so they can bunch up in that area without slowing down the production line. Unfortunately, moving the bottles from single file to a bunch and back to single file can result in bottle jams in the bottle combiners. Consequently, the major stop gaps in bottle production lines are the bottle combiners. The down time that results from such jams is exceedingly expensive and sometimes such jams are fairly difficult to correct and can result in breakage of the bottles and loss of product.

In order to move the bottles from a large bunch into a single file it necessary to funnel the bottles. This funneling is done by simply narrowing the path along which the bottles move until only one bottle at a time may move down along the path. In order to facilitate this movement, vertical roller bars are normally positioned along the sides of the funnel mechanism so that the bottles, which are normally in the upright position, may be more easily funneled. Because the movement of the bottles is essentially the movement of many cylindrical workpieces from a wide space into a narrower space jamming can occur. This is caused by the geometry of the bottles and the fact of friction along the sides of the bottle combiner.

Even with the addition of roller bars along the sidewall of the combiner, in order to produce rolling friction, jamming can still occur because the vertical roller bars have gaps between them in which the curved surfaces of the bottles may fit and thus, in combination with the geometry of the rest of the bottle flow through the combiner, still jam. The problem is that it is impossible to move the vertically placed roller bars close enough to each other in order to eliminate the gap between the roller bars. Thus a bottle is able to slide into the gaps or be jammed into the gaps by the pressure of the other bottles behind it causing a jam.

The device of my invention by means of a unique and simple design eliminates this problem of gaps between the roller bars and greatly reduces jamming in a bottle combiner thus increasing the efficiency at which the combiner works and the speed at which a production line may be run. I know of no prior art design or machine which discloses the unique and simple features of my invention.

SUMMARY OF THE INVENTION

The device of my invention is a sidewall for a bottle combiner or accumulation table in which the sidewall has roller bars of a special design. Described simply my invention is a sidewall construction that works in combination with a standard conveyor system for moving substantially cylindrical workpieces. The sidewall construction is a means for reducing frictional engagement of the substantially cylindrical workpieces with the surfaces of the sidewall construction and to prevent jamming of the movement of the substantially cylindrical workpiece. The sidewall construction comprises:

1. A top plate, a bottom plate, and an end plate.
2. A first plurality of roller bars that act as means for rolling against the substantially cylindrical workpieces on the conveyor system.
3. A second plurality of roller bars that act as means for rolling against the substantially cylindrical workpieces on the conveyor system.
4. Each roller bar of the first plurality of roller bars having width greater than the width of each roller bar of the second plurality of roller bars, and each roller bar of the first plurality of roller bars having at least one slot or gap through which each roller bar of the second plurality of roller bars may pass.
5. The first plurality of roller bars having a first surface.
6. The second plurality of roller bars having a second surface.
7. The first surface and the second surface each having a point lying in a common plane.
8. Each roller bar of each plurality of roller bars having at least two opposed ends.
9. The top plate, the bottom plate, and the end plate each having at least one receiving mechanism or opening for receiving at least one of the ends of each of the roller bar of each of the plurality of roller bars.

Preferably, the roller bars of the first set of roller bars are mounted at a 45 degree angle to the roller bars of the second set; the roller bars contained within each set of roller bars being parallel to each other.

This presents a uniform roller surface along both sides of the accumulation guide or combiner such that no gaps between any roller may appear and there is a constant rolling surface along the entire side of the accumulation guide or combiner. There is no gap between any one set of roller bars and the bottles have no surface on the sides of the accumulation guide against which they may meet resistance sufficient to form a bottleneck or jam type geometry which would prevent their movement from the large accumulation table into a single file.

DESCRIPTION OF THE DRAWINGS

FIG. 1 is a head on plan view of one of the sidewalls of the accumulation table showing the relationship of the first and second set of roller bars.

FIG. 2 is a view from line 2—2 of FIG. 1, showing a cutaway view of the roller bars as they relate to each other.

FIG. 3 is a view from line 3—3 of FIG. 1, showing the top plate of the and the mounting positions of the ends of the first and second roller bars.

FIG. 4 is a line from 4—4 of FIG. 1, showing the bottom plate of the and the mounting positions of the first and second roller bars.

FIG. 5 is a view from line 5—5 of FIG. 1, showing the end plate of the and the mounting positions of the first and second roller bars.

DETAILED DESCRIPTION

Figure 6:
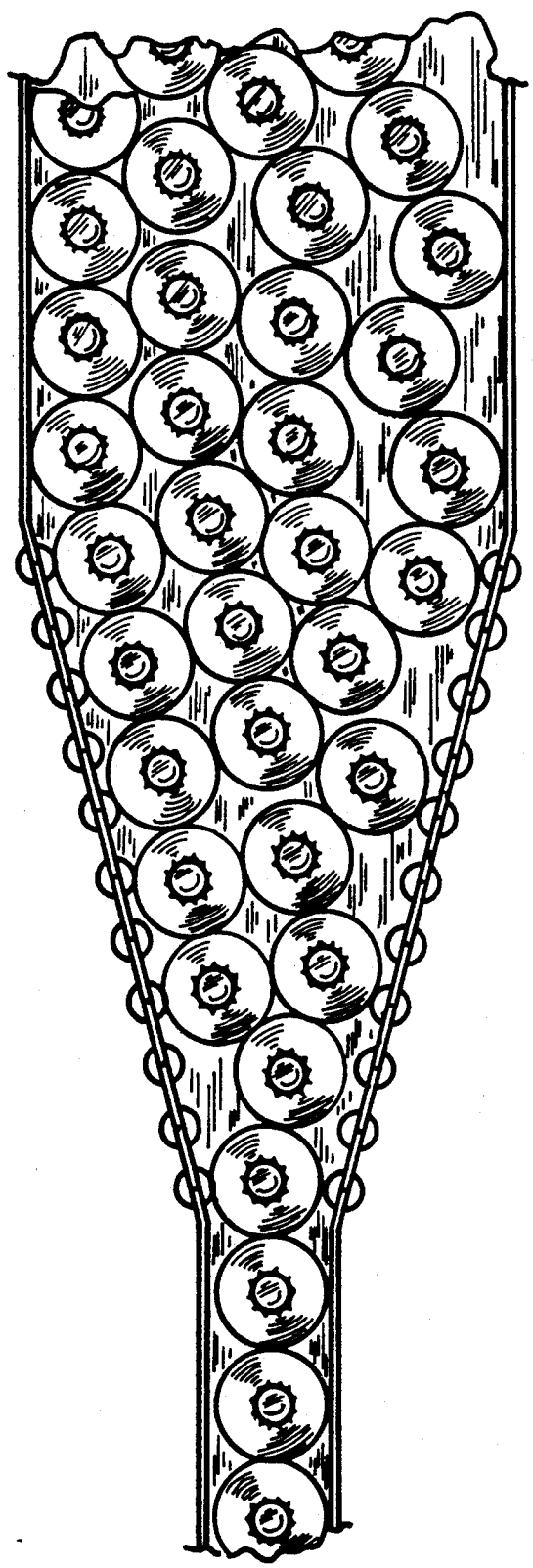
FIG. 6 is a view of an old prior art accumulation guide showing the gaps which occur between the straight up vertical roller bars from the accumulation table to the single file product line.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The present invention is a sidewall 20 of a bottle combiner 10. The sidewall 20 includes a first set of roller bars 50, a second set of roller bars 70, a top plate 22, a bottom plate 24, and an end plate 26; Although, solid metal plates are disclosed specifically it should be noted that the most important feature of the plates is sufficient strength to support the first and second sets of roller bars 50 and 70, so the term plate as used in this description and claims, is meant to mean any structure that may function to properly support roller bars 50 and 70.

The heart of the present invention is the orientation of the first set of roller bars 50 to the second set of roller bars 70. As may be seen from FIG. 1, the first set of roller bars 50 and the second set of roller bars 70 are at right angles to each other such that when mounted on the sidewall they are at 45 degree angles to the bottom plate 24, the top plate 22, and end plate 26 of the sidewall 20.

Referring to FIG. 2, it may be seen that the second set of roller bars 70 are larger in diameter than the first set of roller bars 50 and have slots 72 cut in them to allow for placement of the first set of roller bars 50 through the slots 72 of the second set of roller bars 70. The relationship of the roller bars 50 and 70 is such that the surfaces 54 and 74, of the roller bars 50 and 70, are in alignment with each other at points 55 and 75. Points 55 and 75 generally being in alignment and lying in the same plane. This presents a uniform rolling surface along which the bottles may roll and move. No gaps 11, as disclosed in FIG. 6, occur between the roller bars 50 and 70 by virtue of their right angle orientation to each other and their 45 degree orientation to top plate 22, and bottom plate 24, and end plate 26 of the sidewall 20.

Referring to FIGS. 1-5, it may be seen that roller bars 50 and 70 have end posts 58-59 and 78-79 respectively; that top plate 22 has openings 23 for receiving and posts 59 and 79; that bottom plate 24 has openings 25 for receiving endposts 58 and 78; that endplate 26 has openings 27 for receiving endposts 58 and 79. These openings are of a standard type and are designed to allow free rotation of the roller bars 50 and 70 in a manner already known in the industry; i.e. the same manner as the prior art vertical base disclosed in FIG. 6.

The above described embodiments of this invention are merely descriptive of its principles and are not to be limited. The scope of this invention instead shall be determined from the scope of the following claims, including their equivalents.

What is claimed is:

1. In combination with a conveyor system for moving substantially cylindrical workpieces, a conveyor structure for the sidewall of a bottle combiner for reducing frictional engagement of the substantially cylindrical workpieces with the surfaces of the sidewall and to prevent jamming of the movement of the substantially cylindrical workpieces, the conveyor structure comprising:

a top plate, a bottom plate, and an end plate;

a first plurality of roller bar means for rolling against the substantially cylindrical workpieces on said conveyor system;

a second plurality of roller bar means for rolling against said substantially cylindrical workpieces on said conveyor system;

each roller bar means of the first plurality of roller bar means having a width greater than the width of each roller bar means of the second plurality of roller bar means, and each roller bar means of the first plurality of roller bar means having at least one slot means for providing a slot through which each roller bar means of the second plurality of rollers passes through;

the first plurality of roller bar means having a first surface;

the second plurality of roller bar means having a second surface;

the first surface having a first point and the second surface having a second point; each point lying in a common plane;

the roller bar means of each plurality of roller bar means having at least two opposed ends;

the top plate, the bottom plate, and the end plate each having at least one receiving means for receiving at least one of the ends of each of the roller bar means of each of both the first and second plurality of roller bar means.

2. The combination of claim 1 wherein the first point and the second point are in general alignment with each other.

* * * * *